United States Patent
Jonsson et al.

(10) Patent No.: US 10,920,615 B2
(45) Date of Patent: Feb. 16, 2021

(54) SELF PRESSURIZING SQUEEZE FILM DAMPER

(71) Applicant: United Technologies Corporation, Farmington, CT (US)

(72) Inventors: Ulf J. Jonsson, South Windsor, CT (US); Daniel L. Gysling, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 176 days.

(21) Appl. No.: 15/696,552

(22) Filed: Sep. 6, 2017

(65) Prior Publication Data

US 2019/0071997 A1 Mar. 7, 2019

(51) Int. Cl.
*F01D 25/16* (2006.01)
*F16F 9/10* (2006.01)
(Continued)

(52) U.S. Cl.
CPC .............. *F01D 25/164* (2013.01); *F02C 7/06* (2013.01); *F16C 19/527* (2013.01); *F16C 27/045* (2013.01); *F16F 9/10* (2013.01); *F16F 9/3278* (2013.01); *F16F 9/36* (2013.01); *F16F 9/512* (2013.01); *F16F 15/0237* (2013.01);
(Continued)

(58) Field of Classification Search
CPC ........ F01D 25/164; F02C 7/06; F16C 19/527; F16F 9/10; F16F 9/3278; F16F 9/36; F16F 9/512; F16F 15/0237; F16F 2230/0011; F16F 2230/04; F16F 2230/183; F02K 3/06; F05D 2220/323; F05D 2240/50;
(Continued)

(56) References Cited

U.S. PATENT DOCUMENTS 4,366,994 A * 1/1983 Yoshioka ................ F16C 27/02
384/99
5,071,262 A * 12/1991 Monzel ................. F16C 27/045
384/99
(Continued)

FOREIGN PATENT DOCUMENTS

FR 2965858 A1 * 4/2012 ............ F16C 33/586

OTHER PUBLICATIONS

EPO Search Report dated Feb. 13, 2019 for Application No. 18193057.9.
EP office action for EP18193057.9 dated Jul. 1, 2020.

*Primary Examiner* — Joseph J Dallo
*Assistant Examiner* — Yi-Kai Wang
(74) *Attorney, Agent, or Firm* — Getz Balich LLC

(57) ABSTRACT

A fluid damping structure is provided that includes an inner and outer annular elements, first and second ring seals, first and second outer annular seals. The inner annular element has an outer radial surface and a plurality of annular grooves disposed in the outer radial surface. The outer annular element has an inner radial surface. A damping chamber is defined by the inner and outer annular elements, and the first and second inner ring seal. A first lateral chamber is disposed on a first axial side of the damping chamber. A second lateral chamber is disposed on a second axial side of the damping chamber. A plurality of fluid passages are disposed in at least one of the inner annular element or the inner ring seals. The fluid damping structure is configurable in an open configuration and a closed configuration.

20 Claims, 9 Drawing Sheets

(51) Int. Cl.
*F16F 9/32* (2006.01)
*F16F 9/36* (2006.01)
*F16F 9/512* (2006.01)
*F16F 15/023* (2006.01)
*F16C 19/52* (2006.01)
*F02C 7/06* (2006.01)
*F16C 27/04* (2006.01)
*F02K 3/06* (2006.01)
*F16C 19/06* (2006.01)
*F16C 35/04* (2006.01)

(52) U.S. Cl.
CPC .......... *F02K 3/06* (2013.01); *F05D 2220/323* (2013.01); *F05D 2240/50* (2013.01); *F05D 2240/55* (2013.01); *F05D 2240/60* (2013.01); *F05D 2260/96* (2013.01); *F05D 2260/98* (2013.01); *F16C 19/06* (2013.01); *F16C 35/042* (2013.01); *F16C 2326/43* (2013.01); *F16C 2360/23* (2013.01); *F16F 2230/0011* (2013.01); *F16F 2230/04* (2013.01); *F16F 2230/183* (2013.01)

(58) Field of Classification Search
CPC ............ F05D 2240/53; F05D 2240/55; F05D 2240/60; F05D 2260/96; F05D 2260/98
USPC ........................................................ 415/112
See application file for complete search history.

(56) References Cited

U.S. PATENT DOCUMENTS

| | | | |
|---|---|---|---|
| 5,133,563 A | 7/1992 | Casellato | |
| 5,169,240 A | 12/1992 | Bobo | |
| 5,178,400 A | 1/1993 | Singh | |
| 5,271,315 A | 12/1993 | Jackson | |
| 5,344,239 A * | 9/1994 | Stallone | F01D 25/164 384/99 |
| 6,135,639 A * | 10/2000 | Dede | F16C 27/045 384/581 |
| 9,841,056 B2 * | 12/2017 | Snow | F01D 25/18 |
| 2009/0263058 A1 * | 10/2009 | Gibbons | F01D 25/164 384/99 |
| 2017/0114831 A1 | 4/2017 | Snow et al. | |
| 2017/0307046 A1 * | 10/2017 | Steen | F16C 27/045 |
| 2018/0274588 A1 | 9/2018 | Hudson et al. | |

* cited by examiner

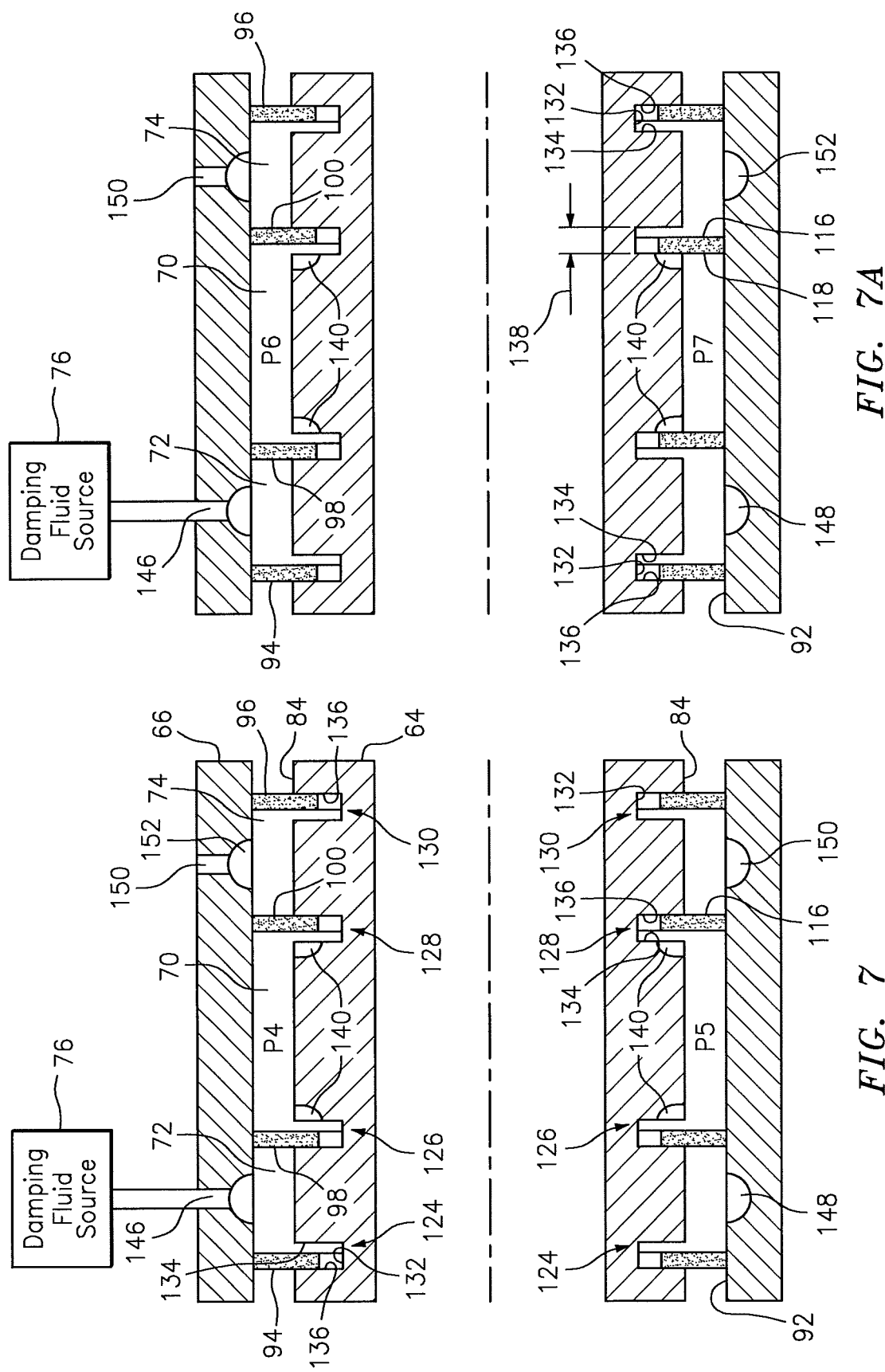

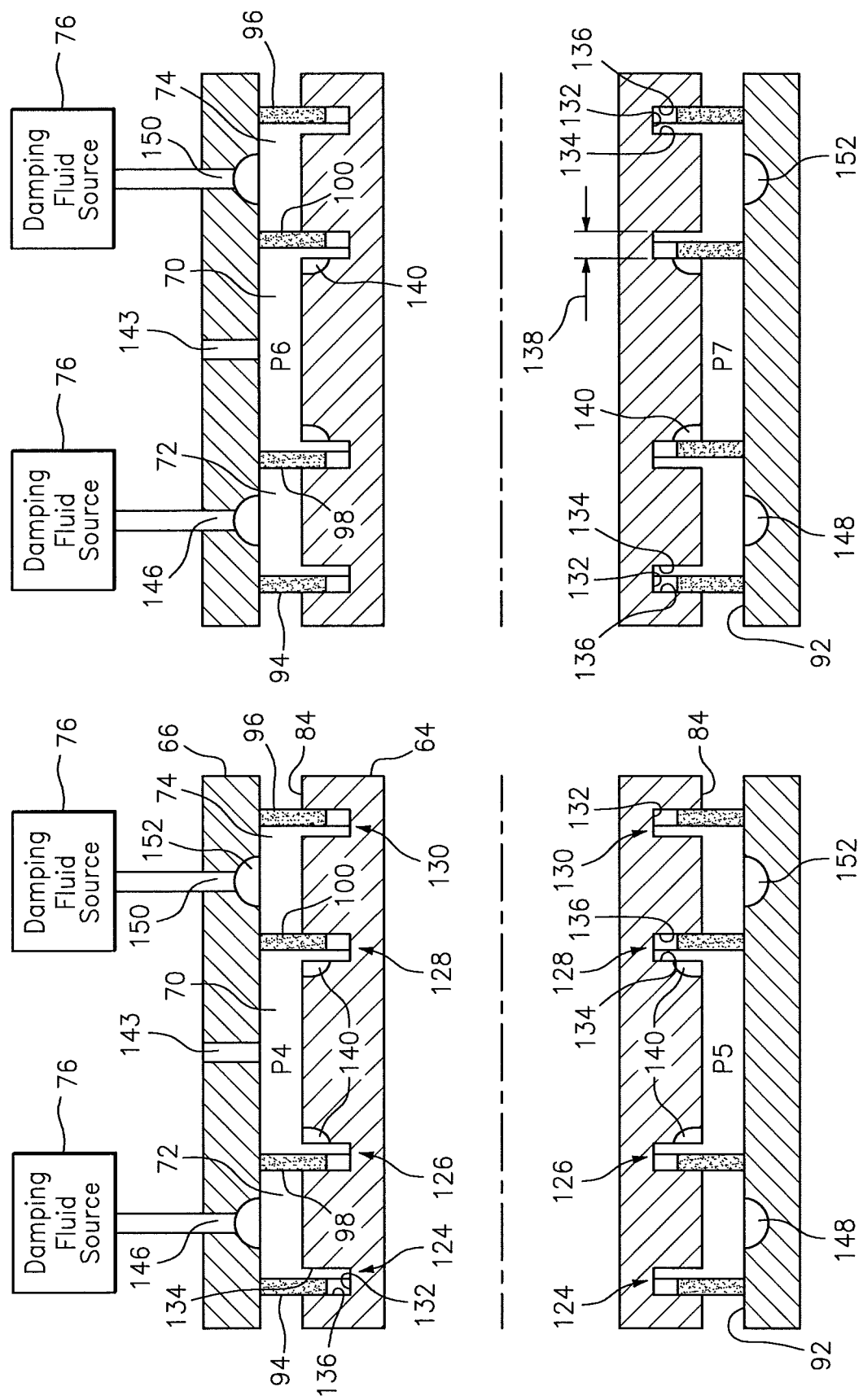

SELF PRESSURIZING SQUEEZE FILM DAMPER

BACKGROUND

1. Technical Field

This disclosure relates generally to a gas turbine engine lubrication systems and methods and more particularly to gas turbine engine lubrication systems and methods for use with fluid damping structures.

2. Background Information

Gas turbine engines are often configured to include a fan section, a low pressure compressor section, a high pressure compressor section, a combustor section, a low pressure turbine section, a high pressure turbine section, a low speed spool, and a high speed spool. The fan section may be configured to drive air along a bypass flow path, while the compressor section drives air along a core flow path for compression and communication into the combustor section then expansion through the turbine section. The low speed spool and the high speed spool are mounted for rotation about an engine central longitudinal axis relative to an engine static structure via several bearing systems. The low speed spool generally interconnects the fan section, the low pressure compressor section and the low pressure turbine section. The high speed spool generally interconnects the high pressure compressor section and the high pressure turbine section. The combustor section is disposed between the high pressure compressor section and the high pressure turbine section.

Under normal operating conditions, a shaft section of a spool (e.g., a shaft section of the high speed spool) will rotate without significant vibration. Under certain operating conditions, however, a spool shaft section may be subject to cyclical, orbital motion which can lead to undesirable vibration. Such cyclical, orbital motion may be the product of temporary thermal bowing of the spool shaft section as a result of a thermal gradient within the engine. Once the thermal gradient sufficiently dissipates, the temporary bowing dissipates and the spool shaft section restores itself to normal operating condition.

As will be appreciated by those skilled in the art, the existence of an imbalance in a spool shaft section may result in a greatly increased demand on the bearing components to restrain the movement of the rotating member or shaft and to transfer the lateral forces induced by the imbalance into the machinery mounting structure.

One method of reducing the aforesaid lateral forces and attendant stresses on the bearings is the use of a fluid damping structure (sometimes referred to as "fluid squeeze damper") between the outer portion of the shaft bearing race or housing and the supporting engine case. The fluid damper structure is a hydrodynamic system wherein a continuously flowing stream of damping fluid (e.g., oil) is supplied to an annular volume formed between the non-rotating outer bearing race (or housing) and the engine support case for the purpose of absorbing and reducing the transverse movement induced by shaft imbalance, temporary or otherwise. The damping fluid, which may be supplied from the engine lubricating system, fills the annular volume and subsequently exits the annular volume and is collected and passed to a recovery system (e.g., including a scavenge sump or the like). Existing systems for providing a pressurized damping fluid to fluid damping structures in all areas of an engines operational profile are problematic. U.S. Pat. No. 5,344,239 discloses a squeeze film damper with annular end plenums.

SUMMARY OF THE DISCLOSURE

According to an aspect of the present disclosure, a fluid damping structure is provided that includes an inner annular element, an outer annular element, a first ring seal, a second ring seal, a first outer annular seal, and a second outer annular seal. The inner annular element has an outer radial surface and a plurality of annular grooves disposed in the outer radial surface. The outer annular element has an inner radial surface. Each inner ring seal has a first lateral surface, a second lateral surface, an inner diameter surface, and an outer diameter surface. A damping chamber is defined by the inner annular element, the outer annular element, the first inner ring seal, and the second inner ring seal. A first lateral chamber is disposed on a first axial side of the damping chamber, and is defined by the inner annular element, the outer annular element, the first inner ring seal, and the first outer annular seal. A second lateral chamber is disposed on a second axial side of the damping chamber, and is defined by the inner annular element, the outer annular element, the second inner ring seal, and the second outer annular seal. A plurality of fluid passages are disposed in at least one of the inner annular element or the inner ring seals. The fluid damping structure is configured such that one or more of the fluid passages is disposed in an open configuration when a local damping fluid pressure within at least one of the lateral chambers exceeds a local damping fluid pressure in an adjacent region of the damping chamber, and the one or more of the fluid passages is disposed in a closed configuration when the local damping fluid pressure within at least one of the lateral chambers is less than the local damping fluid pressure in the adjacent region of the damping chamber.

According to another aspect of the present disclosure a gas turbine engine is provided that includes at least one rotor shaft extending between a compressor section and a turbine section, at least one bearing compartment disposed to support the rotor shaft, the bearing compartment having at least one bearing, at least one fluid damping structure as described above, and a lubrication system configured to provide a fluid flow to the fluid damping structure.

In any of the aspects or embodiments described above and herein, the inner annular element and the outer annular element may be radially spaced apart from one another and disposed about an axially extending centerline, and the outer diameter surface of each inner ring seal may be in contact with the inner radial surface of the outer annular element, and each inner ring seal extends a distance into one of the annular grooves.

In any of the aspects or embodiments described above and herein, the plurality of annular grooves may include a first inner annular groove and a second inner annular groove, each inner annular groove having an inner side surface and an opposing outer side surface and a width that extends there between. The plurality of fluid passages may be disposed in the inner annular element, extending between the inner side surface of each inner annular groove and the outer radial surface of the inner annular element.

In any of the aspects or embodiments described above and herein, the passages may be are disposed uniformly around a circumference of the inner annular element.

In any of the aspects or embodiments described above and herein, the first outer annular seal and the second outer annular seal may be ring seals, and each outer annular seal has an outer diameter surface, and the outer diameter surface of each outer annular seal is in contact with the inner radial surface of the outer annular element, and each outer annular seal extends a distance into one of the annular grooves.

In any of the aspects or embodiments described above and herein, at least some of the plurality of fluid passages are disposed in each first inner ring seal and each second inner ring seal, each of which passages extends between the inner diameter surface and the second lateral surface of the respective inner ring seal.

In any of the aspects or embodiments described above and herein, the passages may be disposed uniformly around a circumference of the respective inner ring seal.

In any of the aspects or embodiments described above and herein, the fluid damping structure may include a first annular plenum disposed in the inner radial surface of the outer annular element aligned with the first lateral chamber, a first lateral chamber port providing fluid communication into the first annular plenum, a second annular plenum disposed in the inner radial surface of the outer annular element aligned with the second lateral chamber, and a second lateral chamber port providing fluid communication into the first annular plenum.

In any of the aspects or embodiments described above and herein, the fluid damping structure may include a first annular plenum disposed in the inner radial surface of the outer annular element aligned with the first lateral chamber, and a second annular plenum disposed in the inner radial surface of the outer annular element aligned with the second lateral chamber.

In any of the aspects or embodiments described above and herein, the fluid damping structure may include a first lateral chamber port disposed within the inner annular element providing fluid communication into the first annular plenum, a second lateral chamber port disposed within the inner annular element providing fluid communication into the second annular plenum, and a damping chamber port disposed within the inner annular element providing fluid communication into the damping chamber.

In any of the aspects or embodiments described above and herein, the fluid damping structure may include a first lateral chamber port disposed within the inner annular element providing fluid communication into the first lateral chamber, a second lateral chamber port disposed within the inner annular element providing fluid communication into the second lateral chamber, and a damping chamber port disposed within the inner annular element providing fluid communication into the damping chamber, and the engine may be configured to provide the fluid flow from the lubrication system to the fluid damping structure through the damping chamber port, and is configured to permit fluid flow to exit the fluid damping structure through the first lateral chamber port and the second lateral chamber port.

In any of the aspects or embodiments described above and herein, the fluid damping structure may include a first lateral chamber port disposed within the inner annular element providing fluid communication into the first lateral chamber, and a second lateral chamber port disposed within the inner annular element providing fluid communication into the second lateral chamber, and the engine may be configured to provide the fluid flow from the lubrication system to the fluid damping structure through the first lateral chamber port, and is configured to permit fluid flow to exit the fluid damping structure through the second lateral chamber port.

In any of the aspects or embodiments described above and herein, the fluid damping structure may include a first lateral chamber port disposed within the inner annular element providing fluid communication into the first lateral chamber, a second lateral chamber port disposed within the inner annular element providing fluid communication into the second lateral chamber, and a damping chamber port disposed within the inner annular element providing fluid communication into the damping chamber, and the engine may be configured to provide the fluid flow from the lubrication system to the fluid damping structure through first lateral chamber port and the second lateral chamber port, and to permit fluid flow to exit the fluid damping structure through the damping chamber port.

The foregoing features and the operation of the present disclosure will become more apparent in light of the following description and the accompanying drawings.

BRIEF DESCRIPTION OF THE DRAWINGS

FIG. 7 is a diagrammatic illustration of a fluid damping structure embodiment shown in a closed configuration.

FIG. 7A is a diagrammatic illustration of the fluid damping structure embodiment shown in in FIG. 7, in an open configuration.

FIG. 11 is a diagrammatic illustration of a fluid damping structure embodiment shown in a closed configuration.

FIG. 11A is a diagrammatic illustration of the fluid damping structure embodiment shown in in FIG. 11, in an open configuration.

DETAILED DESCRIPTION

Figure 1:
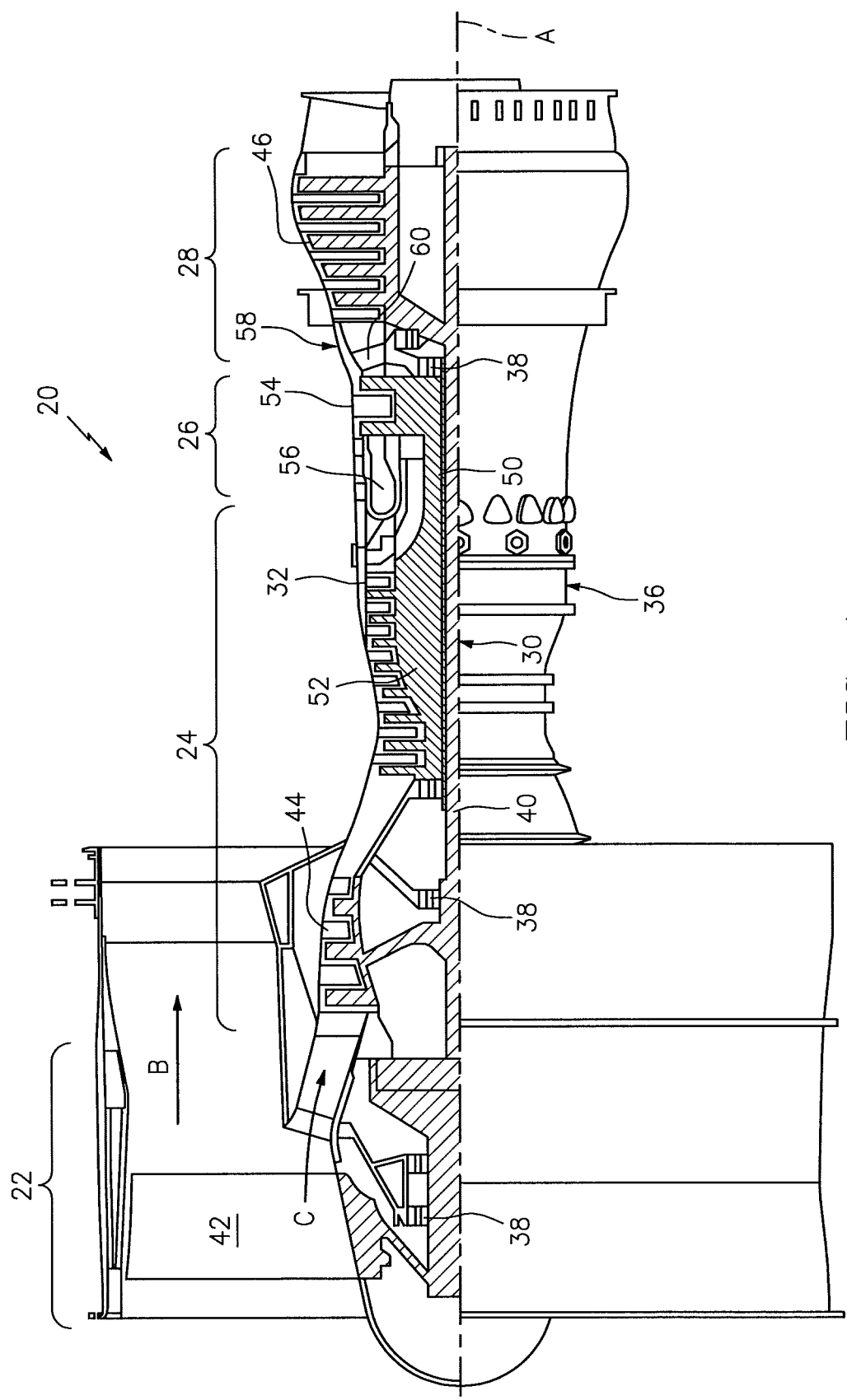
FIG. 1 is a diagrammatic partially sectioned view of a gas turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Referring now to the FIGURES, to facilitate the description of the present disclosure a two-spool turbofan type gas turbine engine 20 is shown (e.g., see FIG. 1). This exemplary embodiment of a gas turbine engine includes a fan section 22, a compressor section 24, a combustor section 26, a turbine section 28, and an engine lubrication system in fluid communication with one or more fluid damping structures. The fan section 22 drives air along a bypass flow path B in a bypass duct, while the compressor section 24 drives air along a core flow path C for compression and communication into the combustor section 26 then expansion through the turbine section 28. Although a two-spool turbofan gas turbine engine is described herein to facilitate the description of the present disclosure, it should be understood that the present disclosure is not limited to use with two-spool turbofans as the teachings may be applied to other types of turbine engines; e.g., three-spool architectures.

The exemplary engine 20 shown in FIG. 1 includes a low speed spool 30 and a high speed spool 32 mounted for rotation about an engine central longitudinal axis A relative to an engine static structure 36 via several bearing systems 38. It should be understood that the location, number, and characteristics of bearing systems 38 may vary to suit the particular application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. The inner shaft 40 and the outer shaft 50 are concentric and rotate via bearing systems 38 about the engine central longitudinal axis "A" which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The gas turbine engine 20 diagrammatically depicted in FIG. 1 is one example of a high-bypass geared aircraft engine. In other examples, the gas turbine engine 20 may have a bypass ratio that is greater than about six (6), with an example embodiment being greater than about ten (10), the geared architecture 48 may be an epicyclic gear train, such as a planetary gear system or other gear system, with a gear reduction ratio of greater than about 2.3 and the low pressure turbine 46 may have a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. The low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one or more embodiments of a geared architecture engine and that the present disclosure is applicable to other gas turbine engines including direct drive turbofans.

Figure 2:
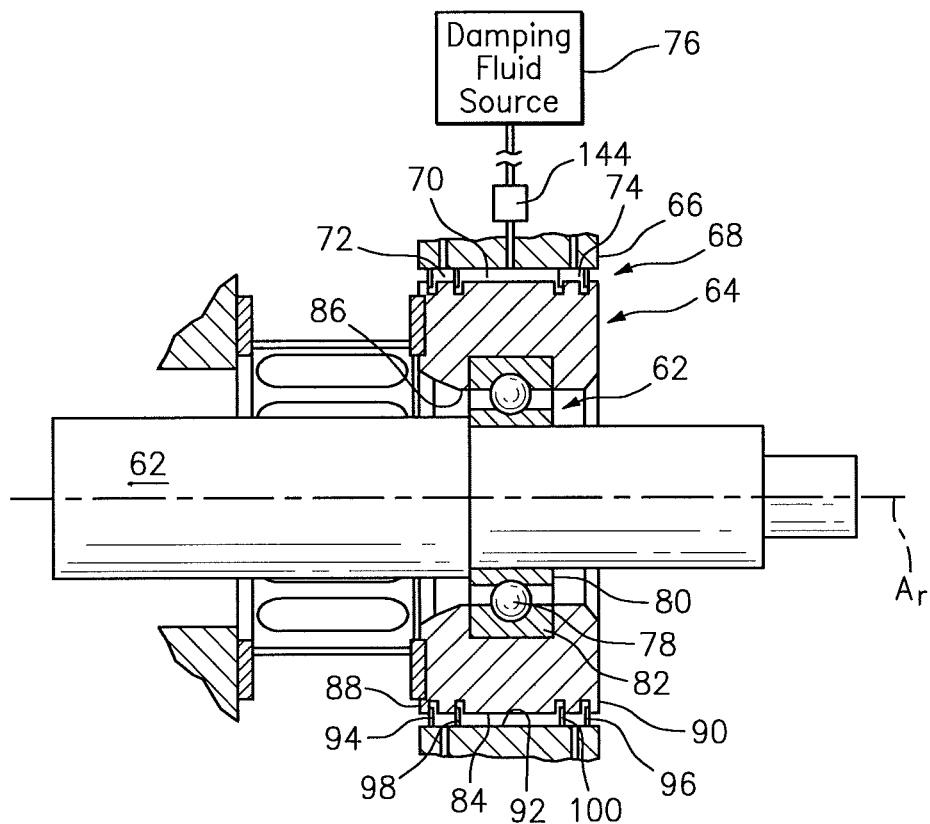
FIG. 2 is a diagrammatic cross-sectional view of a portion of a gas turbine engine showing a bearing compartment with a bearing and a fluid damping structure.

FIG. 2 is a simplified cross-sectional view of a portion of a gas turbine engine. The engine portion includes a rotor shaft 60 (e.g., a shaft section of a high speed spool), a bearing 62, a bearing housing 64, a stator structure 66, and a fluid damping structure 68. The fluid damping structure 68 includes a damping chamber 70, a first lateral chamber 72, and a second lateral chamber 74. A continuous source 76 of damping fluid (e.g., oil) is provided to the fluid damping structure 68 by, for example, the engine lubricating system. The rotor shaft 60 is rotatable about an axis of rotation $A_r$. The bearing 62 includes roller elements 78 (e.g., spherical balls) disposed between an inner race 80 and an outer race 82. The present disclosure is not limited to any particular bearing configuration. The bearing inner race 80 is mounted on the rotor shaft 60 and therefore rotates with the rotor shaft 60. The bearing outer race 82 is not fixed with the rotor shaft 60 and does not rotate about the axis of rotation $A_r$. The bearing housing 64 is nonrotating (i.e., it does not rotate about the axis of rotation $A_r$) and has an outer radial surface 84, an inner radial surface 86, a first lateral surface 88, and a second lateral surface 90. As will be described below, the bearing housing 64 may be subjected to forces that cause a cyclical, orbital motion (sometimes referred to as a "whirl"), but such whirling motion is not considered to be rotation about the rotor shaft axis of rotation $A_r$. The inner and outer radial surfaces 84, 86 extend generally between the first and second lateral surfaces 88, 90. The bearing outer race 82 is engaged with the inner radial surface 86 of the bearing housing 64. The stator structure 66 includes a cylindrical inner radial surface 92 that is spaced radially apart from the outer radial surface 84 of the bearing housing 64.

At least two pairs of seals extend between the bearing housing outer radial surface 84 and the inner radial surface 92 of the stator structure 66. In the embodiment shown in FIGS. 2, 6, 6A, 7, and 7A, the fluid damping structure 68 includes a pair of outer seals and a pair of inner ring seals. The outer seals include a first outer ring seal 94 and a second outer ring seal 96. In an alternative embodiment, the outer seals may be configured as something other than a ring seal. The inner ring seals include a first inner ring seal 98 and a second inner ring seal 100. The inner seal rings are disposed axially between the outer ring seals; e.g., the first inner ring seal 98 is disposed axially between the first outer ring seal 94 and the second inner ring seal 100, and the second inner ring seal 100 is disposed axially between the first inner ring seal 98 and the second outer ring seal 96. The ring seals are spaced axially apart and extend circumferentially about the axis of rotation $A_r$ of the rotor shaft 60.

Figure 3:
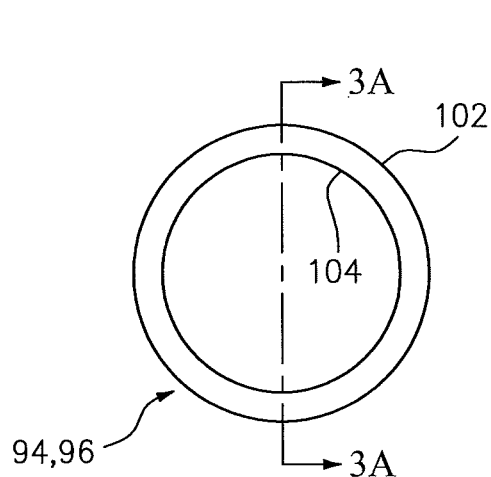
FIG. 3 is a diagrammatic planar view of an outer ring seal embodiment.
Figure 3A:
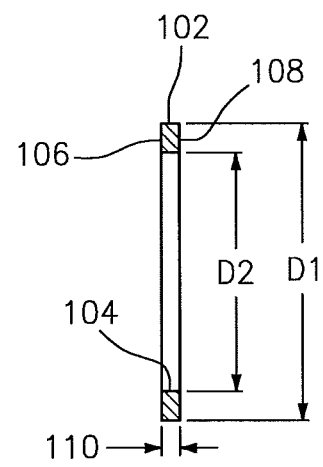
FIG. 3A is a cross-sectional view of the outer ring seal shown in FIG. 3.

Now referring to FIGS. 3 and 3A, each outer ring seal 94, 96 has an outer diameter surface 102 disposed at a diameter "D1", an inner diameter surface 104 disposed at a diameter "D2" (D1>D2), a first lateral surface 106, a second lateral surface 108, and a thickness 110. The first and second lateral surfaces 106, 108 extend between the outer diameter surface 102 and the inner diameter surface 104. The thickness 110 of each outer ring seal 94, 96 extends between the lateral surfaces 106,108.

Figure 4:
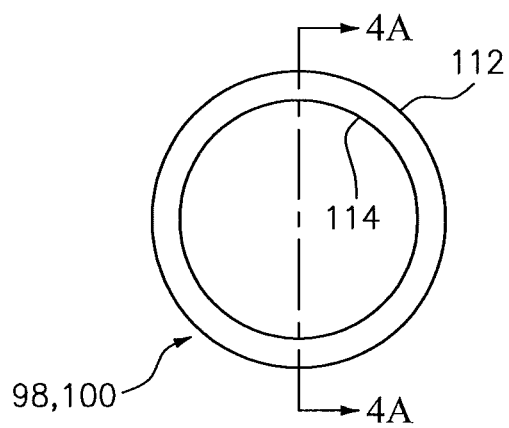
FIG. 4 is a diagrammatic planar view of an inner ring seal embodiment.
Figure 4A:
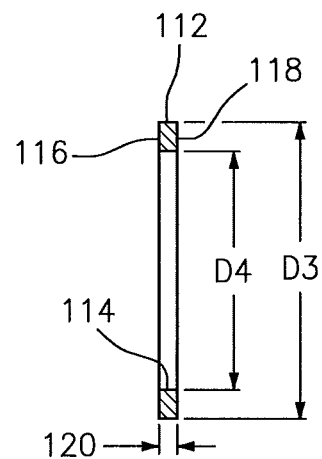
FIG. 4A is a cross-sectional view of the inner ring seal shown in FIG. 4.

Now referring to FIGS. 4 and 4A, each inner ring seal 98, 100 has an outer diameter surface 112 disposed at a diameter "D3", an inner diameter surface 114 disposed at a diameter "D4" (D3>D4), a first lateral surface 116, a second lateral surface 118, and a thickness 120. The first and second lateral surfaces 116, 118 of each inner ring seal 98, 100 extend between the outer diameter surface 112 and the inner diameter surface 114. The thickness 120 of each inner ring seal 98, 100 extends between the lateral surfaces 116, 118.

Figure 5:
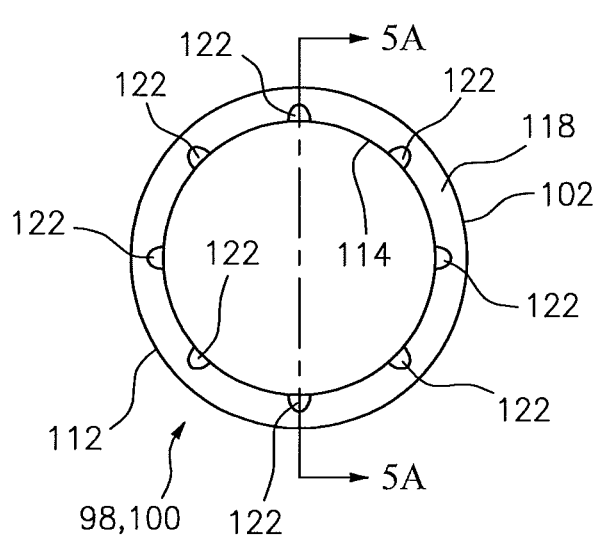
FIG. 5 is a diagrammatic planar view of an inner ring seal embodiment.
Figure 5A:
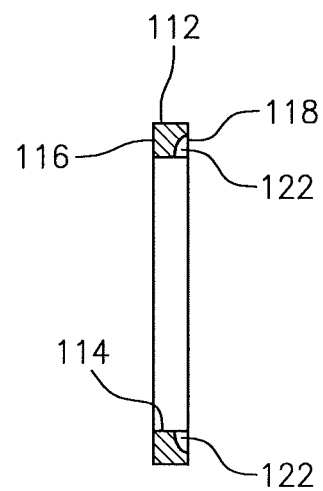
FIG. 5A is a cross-sectional view of the inner ring seal shown in FIG. 5.

In the inner ring seal 98, 100 embodiments shown in FIGS. 3 and 4, the lateral surfaces 116, 118 of the inner ring seals 98,100 may be planar and substantially parallel one another. In some alternative embodiments, each inner ring seals 98, 100 includes a plurality of passages that extend between the inner diameter surface 114 and the second lateral surface 118. For example, FIG. 5 diagrammatically illustrates an inner ring seal 98, 100 embodiment having passages 122 in the form of troughs 122 extending between the inner diameter surface 114 and the second lateral surface 118. These troughs 122 are configured to allow passage of damping fluid through an annular groove, under certain circumstances as will be described below. The troughs 122 are not limited to any particular geometric configuration. The troughs 122 may all have the same geometric configuration, or there may be one or more troughs 122 having a first geometric configuration, one or more troughs 122 having a second configuration, etc. The trough 122 embodiment shown in FIG. 5 breaks through the edge formed at the intersection of the inner diameter surface 114 and the second lateral surface 118 of the inner ring seal 98, 100. The troughs 122 are spaced apart from one another, distributed around the circumference of the respective inner ring seal 98, 100. In the embodiments shown in FIGS. 5 and 5A the troughs 122 are uniformly distributed around the circumference of the inner annular groove 126, 128; i.e., each trough 122 is spaced apart from an adjacent trough 122 by an equal angular separation. FIG. 5 shows the eight troughs 122 disposed around the circumference of the respective inner ring seal 98, 100, each disposed forty-five degrees from the adjacent troughs 122. The present disclosure is not, however, limited to uniformly distributed troughs 122.

Now referring to FIG. 2, the damping chamber 70 portion of the fluid damping structure 68 is defined at least in part by the outer radial surface 84 of the bearing housing 64, the inner radial surface 92 of the stator structure 66, and inner ring seals 98, 100. The first lateral chamber 72 portion of the fluid damping structure 68 is defined at least in part by the outer radial surface 84 of the bearing housing 64, the inner radial surface 92 of the stator structure 66, the first outer ring seal 94, and the first inner seal ring 98. The second lateral chamber 74 portion of the fluid damping structure 68 is defined at least in part by the outer radial surface 84 of the bearing housing 64, the inner radial surface 92 of the stator structure 66, the second outer ring seal 96, and the second inner ring seal 100.

Figures 6, 6A:
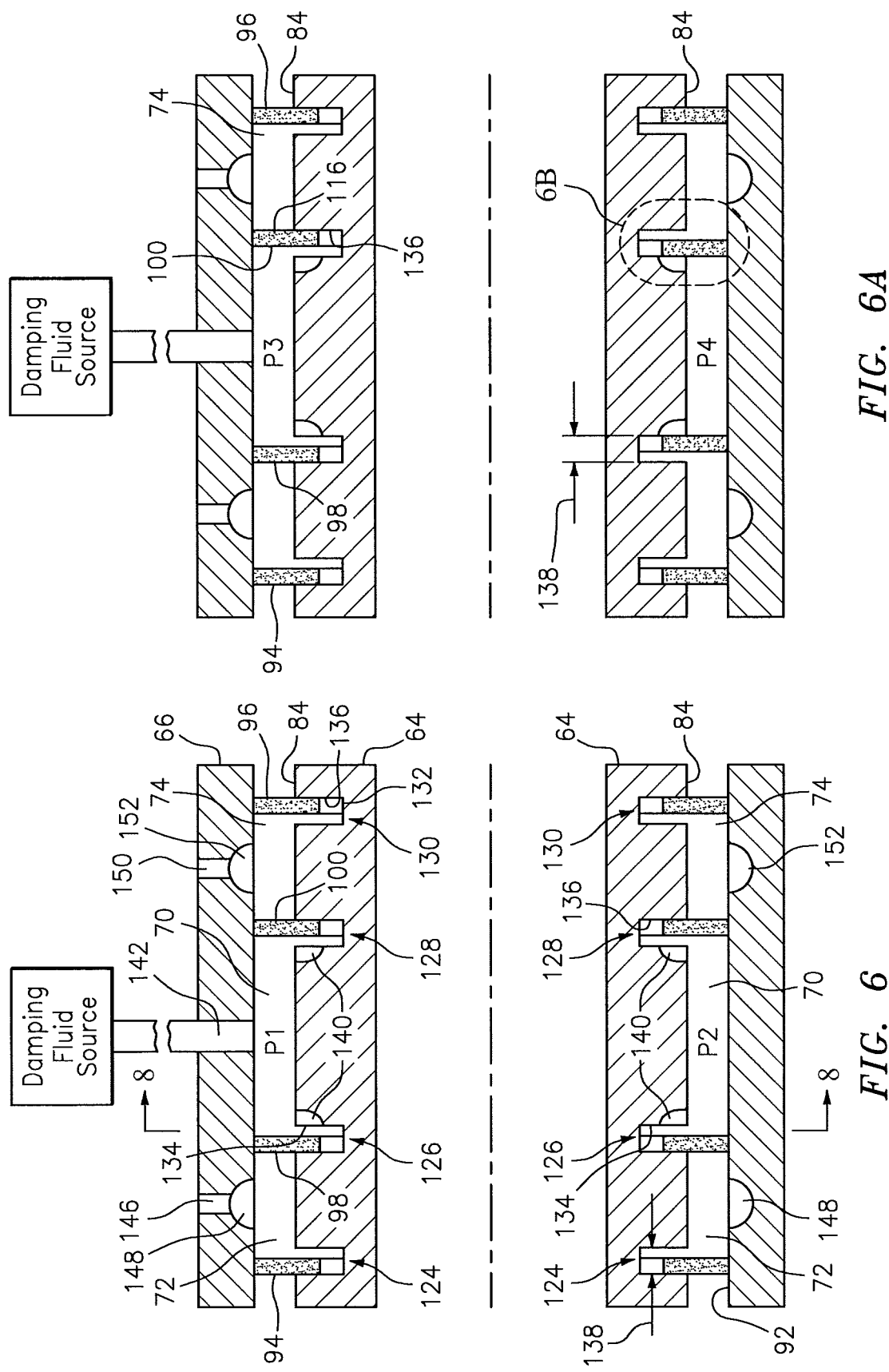
FIG. 6 is a diagrammatic illustration of a fluid damping structure embodiment shown in a closed configuration.
FIG. 6A is a diagrammatic illustration of the fluid damping structure embodiment shown in in FIG. 6, in an open configuration.

The outer radial surface 84 of the bearing housing 64 includes an annular groove for each of the ring seals 94, 96, 98, 100. In the embodiments shown in FIGS. 6 and 7, the outer radial surface 84 of the bearing housing 64 includes a first outer annular groove 124, a first inner annular groove 126, a second inner annular groove 128, and a second outer annular groove 130. The aforesaid grooves 124, 126, 128, 130 are axially spaced apart from one another, and the inner annular grooves 126, 128 are disposed axially between the outer annular grooves 124, 130; e.g., the first inner annular groove 126 is disposed axially between the first outer annular groove 124 and the second inner annular groove 128, and the second inner annular groove 128 is disposed axially between the first inner annular groove 126 and the second outer annular groove 130. The aforesaid annular grooves extend into the outer radial surface 84 of the bearing housing 64 and each has a base surface 132, an inner side surface 134, and an outer side surface 136 opposite the inner side surface 134. The annular groove base surface 132 is located at a depth from the outer radial surface 84. Each annular groove 124, 126, 128, 130 has a width 138 that extends between the opposing side surfaces 134, 136. As will be described below, the width 138 of a given annular groove is greater than the width 110, 120 of the ring seal disposed within the respective groove so that the ring seal may translate axially within the groove. In FIGS. 6 and 7, all of the grooves 124, 126, 128, 130 are shown as having the same geometric configuration and dimensions; e.g., rectangular having the same depth and width. The present disclosure is not, however, limited to all grooves 124, 126, 128, 130 having the same geometric configuration and/or dimensions.

In some embodiments (e.g., see FIGS. 6 and 7), the bearing housing 64 has a plurality of passages 140 engaged with each inner annular groove 126, 128, each passage 140 extending between inner side surface 134 of the respective groove and the outer radial surface 84 of the bearing housing 64. The passages 140 are configured to provide a conduit for damping fluid through the inner annular groove 126, 128, under certain circumstances as will be explained below. The passages 140 are spaced apart from one another, distributed around the circumference of the respective inner annular groove 126, 128. The passages 140 may, for example, be uniformly spaced around the circumference of the respective inner annular groove 126, 128. The present disclosure is not, however, limited to uniformly distributed passages 140. Each passage 140 is configured to extend into the respective inner annular groove 126,128 at a radial position at least in part exposed below the inner diameter surface 114 of the respective inner ring seal 98, 100 as will be explained below.

Figure 8:
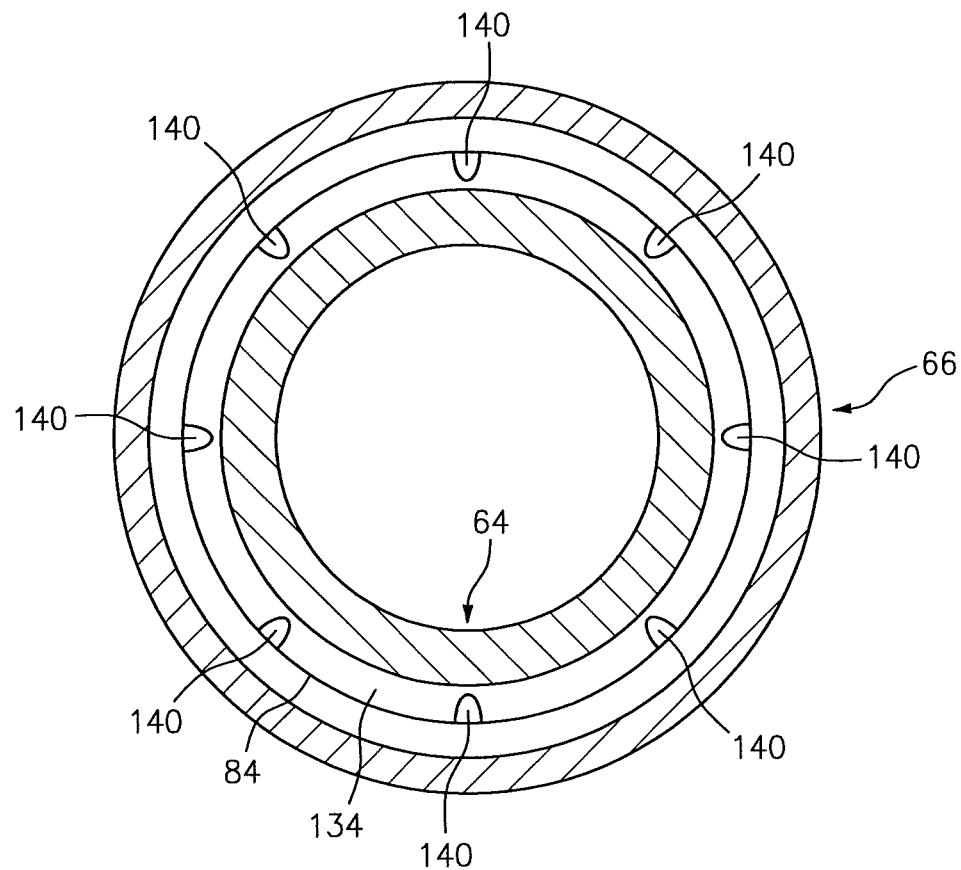
FIG. 8 is a sectional view of the diagrammatic fluid damping structure shown in FIG. 6.

FIGS. 6 and 7 illustrate a non-limiting example of a passage 140 in the form of a trough that extends into the inner side surface 134 of the respective inner annular groove 126, 128, and extends into the outer radial surface 84 of the bearing housing 64, thereby providing a fluid passage between inner side surface 134 of the inner annular groove 126, 128 and the outer radial surface 84 of the bearing housing 64. The troughs 140 are spaced apart from one another, distributed around the circumference of the respective inner annular groove 126,128. In the embodiments shown in FIGS. 6 and 7, the troughs 140 are uniformly distributed around the circumference of the inner annular groove 126, 128; i.e., each trough 140 is spaced apart from an adjacent trough 140 by an equal angular separation. FIG. 8 shows the eight troughs 140 disposed around the circumference of the respective inner annular groove 126, 128, each disposed forty-five degrees from the adjacent troughs 140. The present disclosure is not, however, limited to uniformly distributed troughs 140.

Figure 9:
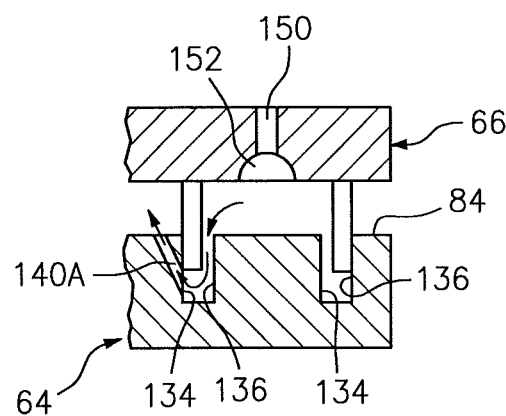
FIG. 9 is a diagrammatic partial sectional view of a fluid damping structure illustrating a passage embodiment.

As indicated, the troughs 140 are configured to provide a passage for damping fluid out of, or into, the inner annular groove 126,128, under certain circumstances. The troughs 140 are not limited to any particular geometric configuration. The troughs 140 may all have the same geometric configuration, or there may be one or more troughs 140 having a first geometric configuration, one or more troughs 140 having a second configuration, etc. The trough 140 embodiment shown in FIGS. 6-8 breaks through the edge formed at the intersection of the inner side surface 134 of the respective inner annular groove 126, 128 and the outer radial surface 84 of the bearing housing 64. The geometric characteristics of the troughs 140 may be chosen to suit the application; e.g., sized to permit adequate fluid flow under the anticipated operating condition of the device. To be clear, the troughs 140 shown in FIGS. 6-8 are non-limiting examples of a passage extending between the inner side surface 134 of an inner annular groove 126, 128 and the outer radial surface 84 of the bearing housing 64, and the present disclosure is not limited to this particular embodiment. As another example (e.g., see FIG. 9), the passages may be apertures 140A that extend between the inner side surface 134 of an inner annular groove 126, 128 and the outer radial surface 84 of the bearing housing 64. Such apertures 140A would not break through the edge formed at the intersection of the inner side surface 134 of the inner annular groove 126, 128 and the outer radial surface 84 of the bearing housing 64.

As indicated above, the pairs of ring seals 94, 96, 98, 100 extend between the bearing housing outer radial surface 84 and the inner radial surface 92 of the stator structure 66. The outer diameter surface of each ring seal is typically biased against the inner radial surface 92 of the stator structure 66 and provides some amount fluid sealing there between. In the embodiment shown in FIGS. 6, 7, and 9, each of the inner and outer ring seals are received a distance into the respective annular groove; e.g., each inner ring seal 98, 100 extends a distance into one of the inner annular grooves 126, 128, and each outer ring seal 94, 96 extends a distance into one of the outer annular grooves 124, 130.

The fluid damping structure 68 is configured to provide damping fluid to the damping chamber 70, the first lateral chamber 72, and the second lateral chamber 74. In the embodiment shown in FIG. 6, for example, the fluid damping structure 68 includes a fill port 142 disposed in the stator structure 66 that permits damping fluid to enter the damping chamber 70 through the inner radial surface 92 of the stator structure 66. The fill port 142 is in fluid communication with the damping fluid source 76 (e.g., the engine lubrication system) and may include a one way check valve 144 (see FIG. 2) that allows fluid to enter the damping chamber 70 but prevents fluid passage in the opposite direction. The embodiment shown in FIG. 6 may further include a first lateral chamber port 146 and an annular plenum 148 disposed in the inner radial surface 92 of the stator structure 66 aligned with the first lateral chamber 72, and a second lateral chamber port 150 and an annular plenum 152 disposed in the inner radial surface 92 of the stator structure 66 aligned with the second lateral chamber 74. The annular plenums 148, 152 are shown diagrammatically as having an arcuately shaped cross-section, but are not limited thereto. For example, in FIGS. 6, 6A, 7, and 7A the annular plenums are shown disposed in an embodiment of the inner radial surface 92 that extends in a single plane across the first lateral chamber 72, the damping chamber 70, and the second lateral chamber. In alternative embodiments, the inner radial surface 92 may have a non-planar configuration wherein the geometry of one or both of the lateral chambers 72, 74 differ from that of the damping chamber 70, and thereby functions as an annular plenum. In still further alternative embodiments, the outer radial surface 84 of the bearing housing 64 may include an annular plenum or be configured to function as an annular plenum.

In an alternative embodiment shown in FIG. 7, the fluid damping structure 68 includes a first lateral chamber port 146 and an annular plenum 148 disposed in the inner radial surface 92 of the stator structure 66 aligned with the first lateral chamber 72, and a second lateral chamber port 150 and an annular plenum 152 disposed in the inner radial surface 92 of the stator structure 66 aligned with the second lateral chamber 74. One of the first or second lateral chamber ports 146, 150 is in fluid communication with the damping fluid source 76 (e.g., the engine lubrication system) and may include a one way check valve (e.g., like that shown in FIG. 6) that allows fluid to enter the respective lateral chamber 72, 74 but prevents fluid passage in the opposite direction. FIG. 7 shows the first lateral chamber port 146 in fluid communication with the damping fluid source 76.

In an alternative embodiment shown in FIG. 11, the fluid damping structure 68 includes a first lateral chamber port 146 and an annular plenum 148 disposed in the inner radial surface 92 of the stator structure 66 aligned with the first lateral chamber 72, and a second lateral chamber port 150 and an annular plenum 152 disposed in the inner radial surface 92 of the stator structure 66 aligned with the second lateral chamber 74. Both of the first and second lateral chamber ports 146, 150 are in fluid communication with the damping fluid source 76 (e.g., the engine lubrication system) and may include a one way check valve (e.g., like that shown in FIG. 6) that allows fluid to enter the respective lateral chamber 72, 74 but prevents fluid passage in the opposite direction. An exit port 143 extends through the stator structure 66 at a position aligned with the damping chamber.

In a gas turbine engine that is operating under "normal" conditions (e.g., in a constant RPM cruise mode), the fluid pressure within the damping chamber 70 is substantially consistent around the circumference of the damping chamber 70. In an imbalanced condition (e.g., operating conditions such as a thermal gradient within an engine that exists at start up) however, a rotating spool shaft 60 may be subject to cyclical, orbital motion (i.e., "whirl"). This type of imbalanced condition and motion can create variations in fluid pressure within the damping chamber 70 (i.e., a dynamic pressure component that varies as a function of time and circumferential position). The variations in pressure may be considered as a pressure field representative of forces acting on the rotor shaft 60 during whirl by the film of damping fluid disposed between the outer radial surface 84 of the bearing housing 64 and the inner radial surface 92 of the stator structure 66, around the circumference of the damping chamber 70. The stator structure 66 is fixed, and the bearing housing 64 whirls with the rotor shaft 60. The pressure field develops as the rotor shaft 60 whirls, resolving the net force acting on the rotor into components that align with the eccentricity and components that are perpendicular to the eccentricity. When rotor shaft 60 whirl occurs, the pressure field will include a region of positive pressure with respect to the circumferential mean of the pressure within the damping chamber 70 (i.e., a region of pressure greater than the circumferential mean pressure), and a region of negative pressure with respect to the circumferential mean of the pressure within the damping chamber 70 (i.e., a region of pressure less than the circumferential mean pressure). The circumferential differences in pressure within the damping chamber 70 cause the damping fluid to travel circumferentially within the damping chamber 70.

Figure 10:
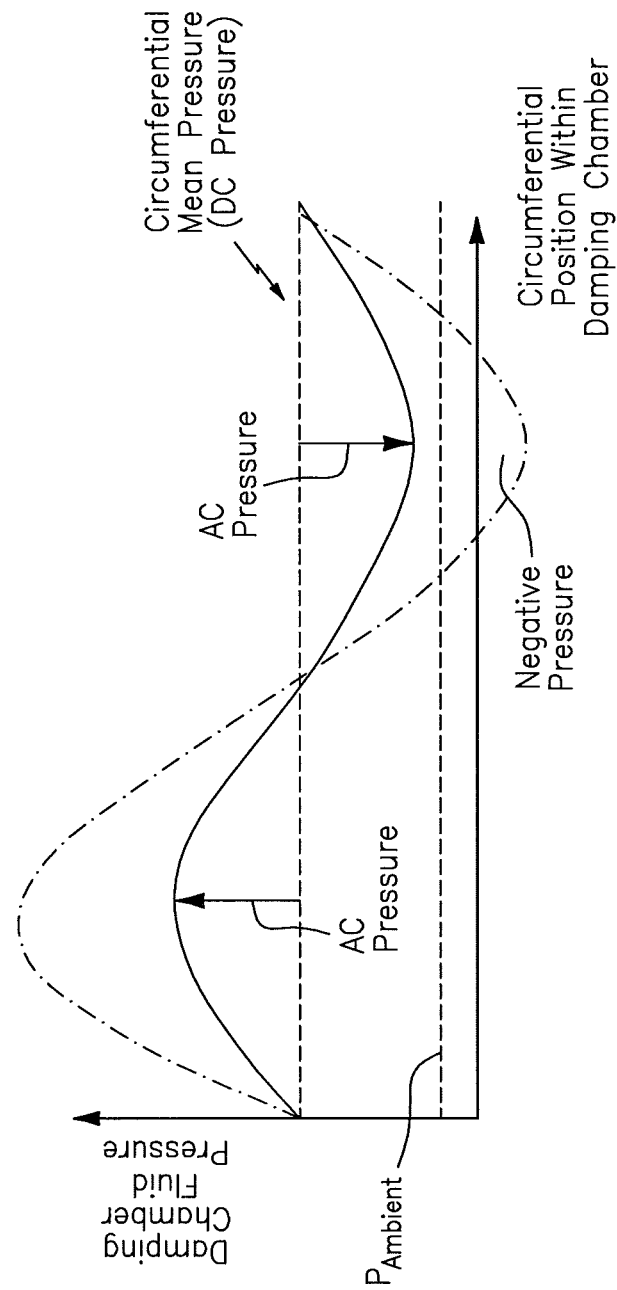
FIG. 10 is a graph depicting damper chamber fluid pressure versus circumferential position within the damping chamber.

To visualize the aforesaid pressure field, it is useful to "unwrap" the fluid pressure within the damping chamber 70 as a function of circumferential position as shown in FIG. 10. In this idealized representation, the circumferential mean pressure (sometimes referred to as the "DC" pressure) within the damping chamber is typically set by the characteristics of the damper fluid supply system and the leakage of the oil through the ring seals. As the ring seals approach ideal seals (i.e., no leakage), the DC pressure approaches the damping fluid supply pressure. The unsteady part of the pressure within the damping chamber (sometimes referred to as the "AC" pressure) amplitude, builds with whirl amplitude. The larger the whirl, the larger the AC pressure amplitude becomes. This idealized model works well conceptually until the zero-to-peak amplitude of the AC pressure causes the local pressure to fall below compartment pressure (denoted as $P_{ambient}$ in FIG. 10). In some prior art squeeze film dampers, if the pressure within a damping chamber falls below $P_{ambient}$, air within an engine compartment adjacent to the damping chamber may be drawn into the damping chamber from the adjacent engine compartment. Once air, or any gas, is entrained within the prior art damping chamber, the effectiveness of the squeeze film damper may be compromised. In some instances, if the damping chamber of a prior art squeeze film damper is isolated from any ingress of air from the adjacent engine compartment into the damping chamber, the damping fluid within the damping chamber may cavitate if the local pressure within the damping chamber is reduced below the vapor pressure of the damping fluid and thereby compromise the effectiveness of the squeeze film damper.

To decrease or avoid the possibility of an influx of gas (e.g., compartment air) into the damping chamber 70 of the present fluid damping structure 68 and/or damping fluid cavitation within the damping chamber 70, the present fluid damping structure 68 is configured to "self-pressurize" the damping chamber 70.

Using the exemplary embodiment shown in FIG. 6 as an example, as a gas turbine engine 20 is operated in a start-up mode (e.g., rotor shaft low rpms), damping fluid is fed into the damping chamber 70 via the fill port 142 extending through the stator structure 66. Some amount of the damping fluid bypasses the inner ring seals 98,100, enters and fills the first and second lateral chambers 72, 74. In a short period of time, some amount of the damping fluid within the first and second lateral chambers 72, 74 will exit the lateral chambers bypassing the outer ring seals 94,96 and/or via the first and second lateral chamber ports 146, 150. The damping fluid exiting the lateral chambers 72,74 may exit into the adjacent engine compartment where it is collected and returned to the main lubrication system via a scavenging system. Hence, the damping fluid cycles through the fluid damping structure 68 during operation. The first and second lateral chamber ports 146, 150 are configured to provide an appropriate amount of flow impedance so that the lateral chambers 72, 74 remain filled with pressurized damping fluid during operation. In those embodiments that include an annular plenum 148, 152 in communication with the respective lateral chamber port 146, 150, the annular plenum 148, 152 assists in maintaining in circumferential fluid pressure uniformity within the lateral chamber 72, 74. Under normal conditions (e.g., no whirl), the fluid pressure within the damping chamber 70 is substantially uniform around the circumference of the damping chamber 70. The substantially uniform fluid pressure is diagrammatically illustrated by the pressure values P1 and P2 in different regions substantially equally one another; i.e., P1≈P2, and the fluid damping structure 68 will continue to operate in this mode indefinitely and the circumferential pressure field within the damping chamber 70 will remain substantially uniform. In this mode, elevated relative fluid pressure within the damping chamber 70 will force the first lateral surface 116 of the each inner ring seal 98, 100 into contact with the outer side surface 136 of the respective inner annular groove 126, 128 and will provide fluid sealing there between albeit with some amount of leakage. In this configuration, the passages 140 (e.g., disposed within the bearing housing 64 or the passages 122 disposed in the lateral surface 118 of the inner ring seal 98, 100) may be described as being in a closed configuration since any fluid flow through the passages 140, 122 remains within the damping chamber 70 and does not contribute to any damping fluid flow (e.g., leakage about the ring seal that may occur) between the damping chamber and one or both of the lateral chambers 72, 74.

Figures 6B, 6C:
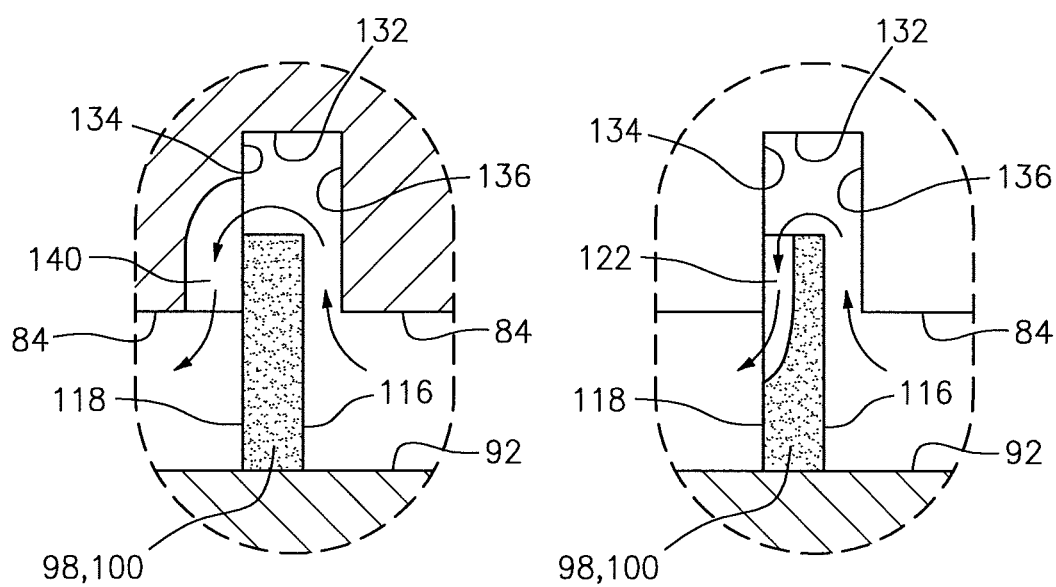
FIG. 6B is an enlarged partial view of FIG. 6A.
FIG. 6C is an enlarged partial view of FIG. 6A, illustrating a different embodiment.

Under circumstances wherein the rotor shaft 60 is experiencing whirl, an unsteady circumferential pressure field as described above will develop. In the high pressure region (e.g., P3—See FIG. 6A) of the circumferential pressure field, the fluid pressure within the damping chamber 70 will continue to force a first lateral surface 116 of the each inner ring seal 98, 100 into contact with the outer side surface 136 of the respective inner annular groove 126, 128 and provide fluid sealing there between. In the low pressure region (e.g., P4) of the circumferential pressure field, in contrast, the fluid pressure within the adjacent lateral chambers 72, 74 will exceed the fluid pressure within the adjacent damping chamber 70 region. As a result and in that region, the inner ring seal 98, 100 will deflect away from the outer side surface 136 of the respective inner annular groove 126, 128 toward the inner side surface 134 of the aforesaid inner annular groove 126, 128. If the difference in pressure is great enough, the inner ring seal 98, 100 second lateral surface 118 will be held in contact with the inner side surface 134 of the respective inner annular groove 126, 128 (e.g., as shown in the bottom of FIG. 6A). As a result, the passages 140 (e.g., disposed within the bearing housing 64 or the passages 122 disposed in the lateral surface 118 of the inner ring seal 98, 100) aligned with the damping chamber 70 low pressure region permit a flow of damping fluid from the respective lateral chamber 72, 74, through the inner annular groove 126, 128, and into the aforesaid region of the damping chamber 70 motivated by the difference in fluid pressure between the adjacent lateral chamber region and the damping chamber region. FIGS. 6B and 6C show enlarged views of this configuration. The aforesaid fluid flow causes a local increase in damping fluid pressure within the damping chamber 70 that helps prevent or eliminates the possibility of cavitation of damping fluid within the low fluid pressure region, and improves the performance of the fluid damping structure 68. The damping fluid structure configuration having lateral chambers 72,74 adjacent the damping chamber 70 helps prevent or eliminates the ingress of compartment air into the damping chamber 70. The eccentric whirling of the rotor shaft 60 and bearing housing 64 makes the above described creation of high pressure regions and low pressure regions a dynamic event that can be accommodated at any circumferential position by the present fluid damping structure 68; e.g., the circumferentially distributed passages 122, 140. In this configuration, the passages 140 (e.g., disposed within the bearing housing 64 or the passages 122 disposed in the lateral surface 118 of the inner ring seal 98, 100) may be described as being in an open configuration since fluid flow through the passages 140, 122 contributes to damping fluid flow (e.g., in addition to any leakage about the ring seal that may occur) between the damping chamber and one or both of the lateral chambers 72, 74.

The fluid damping structure 68 embodiment shown in FIG. 7 operates in a manner similar to that described above in terms of the fluid damping structure 68 embodiment shown in FIGS. 6 and 6A. The fluid damping structure 68 embodiment shown in FIG. 7, however, illustrates an alternative damping fluid travel path through the fluid damping structure 68. As described above, in the alternative embodiment one of the first or second lateral chamber ports 146, 150 is in fluid communication with the damping fluid source 76 (e.g., the engine lubrication system). In the diagrammatic illustration of FIGS. 7 and 7A, the first lateral chamber port 146 is shown in communication with the damping fluid source 76. In this configuration as a gas turbine engine 20 is operated in a start-up mode (e.g., rotor shaft low rpms), damping fluid is fed into the first lateral chamber 72 via the first lateral chamber fill port 146. Some amount of the damping fluid bypasses the first inner ring seal 98, enters and fills the damping chamber 70, and subsequently bypasses the second inner ring seal 100, enters and fills the second lateral chamber 74. Similar to the description above, some amount of the damping fluid will exit the lateral chambers 72, 74 bypassing the outer ring seals 94, 96. In this configuration, some amount of damping fluid may also exit the second lateral chamber 74 via the second lateral chamber port 150. The damping fluid exiting the lateral chambers 72, 74 may exit into the adjacent engine compartment where it is collected and returned to the main lubrication system via a scavenging system. The second lateral chamber port 150 may be configured to provide an appropriate amount of flow impedance so that the second lateral chamber 74 remains filled with pressurized damping fluid during operation.

Under normal conditions (e.g., no whirl), the fluid pressure within the damping chamber 70 is substantially uniform around the circumference of the damping chamber 70. The substantially uniform fluid pressure is diagrammatically illustrated in FIG. 7 by the pressure values P4 and P5 in different regions substantially equally one another (i.e., P4≈P5), and the fluid damping structure 68 will continue to operate in this mode indefinitely and the circumferential pressure field within the damping chamber 70 will remain substantially uniform. As described above, in this configuration the passages 140, 122 are in a closed configuration.

Under circumstances wherein the rotor shaft 60 is experiencing whirl, an unsteady circumferential pressure field as described above will develop. In the high pressure region of the circumferential pressure field (e.g., P6 as shown in FIG. 7A), the fluid pressure within the damping chamber 70 will continue to force the first lateral surface 116 of the each inner ring seal 98, 100 into contact with the outer side surface 136 of the respective inner annular groove 126, 128 and provide fluid sealing there between. In the low pressure region of the circumferential pressure field (e.g., P7 as shown in FIG. 7A), in contrast, the fluid pressure within the adjacent lateral chambers 72, 74 will exceed the fluid pressure within the adjacent damping chamber region. As a result and in that region, the inner ring seal 98, 100 will deflect away from the outer side surface 136 of the respective inner annular groove 126, 128 toward the inner side surface 134 of the aforesaid inner annular groove 126, 128. If the difference in pressure is great enough, the inner ring seal 98, 100 will be held in contact with the inner side surface 134 of the respective inner annular groove 126, 128 (e.g., as shown in the bottom of FIG. 7A). As a result, the passages 140 (e.g., disposed within the bearing housing 64 or the passages 122 disposed in the lateral surface of the inner ring seal 98, 100) aligned with the damping chamber 70 low pressure region permit a flow of damping fluid from the respective lateral chamber 72, 74, through the inner annular groove 126, 128, and into the aforesaid region of the damping chamber 70 motivated by the difference in fluid pressure between the adjacent lateral chamber region and the damping chamber 70 region. As described above, in this configuration the passages 140, 122 are in an open configuration.

The fluid damping structure 68 embodiment shown in FIGS. 11 and 11A operates in a manner similar to that described above in terms of the fluid damping structure 68 embodiment shown in FIGS. 6, 6A, 7, and 7A. The fluid damping structure 68 embodiment shown in FIGS. 11 and 11A, however, illustrates an alternative damping fluid travel path through the fluid damping structure 68. As described above, in this alternative embodiment both of the first and second lateral chamber ports 146, 150 are in fluid communication with the damping fluid source 76 (e.g., the engine lubrication system). In this configuration as a gas turbine engine 20 is operated in a start-up mode (e.g., rotor shaft low rpms), damping fluid is fed into the first lateral chamber 72 via the first lateral chamber fill port 146, and into the second lateral chamber 74 via the second lateral chamber fill port 150. Some amount of the damping fluid bypasses the first and second inner ring seals 98, 100, enters and fills the damping chamber 70. Similar to the description above, some amount of the damping fluid will exit the lateral chambers 72, 74 bypassing the outer ring seals 94, 96. In this configuration, some amount of damping fluid may also exit the damping chamber 70 via the exit port 143. The damping fluid exiting the lateral chambers 72, 74 may exit into the adjacent engine compartment where it is collected and returned to the main lubrication system via a scavenging system. The damping fluid exiting the damping chamber 70 via the exit port 143 may be passed directly to a scavenging system, or may pass into the adjacent engine compartment. The exit port 143 may be configured to provide an appropriate amount of flow impedance so that the damping chamber 70 remains filled with pressurized damping fluid during operation.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:
1. A fluid damping structure, comprising:
   an inner annular element having an outer radial surface and a plurality of annular grooves disposed in the outer radial surface;
   an outer annular element having an inner radial surface;
   a first inner ring seal and a second inner ring seal, each inner ring seal having a first lateral surface, a second lateral surface, an inner diameter surface, and an outer diameter surface;
   a first outer annular seal and a second outer annular seal;

a damping chamber defined by the inner annular element, the outer annular element, the first inner ring seal, and the second inner ring seal;

a first lateral chamber disposed on a first axial side of the damping chamber, and defined by the inner annular element, the outer annular element, the first inner ring seal, and the first outer annular seal;

a second lateral chamber disposed on a second axial side of the damping chamber, and defined by the inner annular element, the outer annular element, the second inner ring seal, and the second outer annular seal, wherein the second axial side is opposite the first axial side;

a plurality of fluid passages disposed in at least one of the inner annular element or the inner ring seals, wherein said fluid passages disposed in the inner annular element are engaged with at least two of the plurality of annular grooves;

a first annular plenum disposed in the inner radial surface of the outer annular element aligned with the first lateral chamber;

a first lateral chamber port providing fluid communication into the first annular plenum;

a second annular plenum disposed in the inner radial surface of the outer annular element aligned with the second lateral chamber; and a second lateral chamber port providing fluid communication into the second annular plenum;

wherein the fluid damping structure is configured such that one or more of the fluid passages is disposed in an open configuration when a local damping fluid pressure within the damping chamber is less than a local damping fluid pressure in an adjacent region of one or both of the lateral chambers, and the one or more of the fluid passages is disposed in a closed configuration when the local damping fluid pressure within the damping chamber is greater than the local damping fluid pressure in the adjacent region of the one or both lateral chambers.

2. The fluid damping structure of claim 1, wherein the inner annular element and the outer annular element are radially spaced apart from one another and disposed about an axially extending centerline, and
    wherein the outer diameter surface of each inner ring seal is in contact with the inner radial surface of the outer annular element, and each inner ring seal extends a distance into one of the annular grooves.

3. The fluid damping structure of claim 1, wherein the plurality of annular grooves include a first inner annular groove and a second inner annular groove, each inner annular groove having an inner side surface and an opposing outer side surface and a width that extends there between; and
    wherein the plurality of fluid passages are disposed in the inner annular element, extending between the inner side surface of each inner annular groove and the outer radial surface of the inner annular element.

4. The fluid damping structure of claim 3, wherein the passages are disposed uniformly around a circumference of the inner annular element.

5. The fluid damping structure of claim 1, wherein the first outer annular seal and the second outer annular seal are ring seals, and each outer annular seal has an outer diameter surface, and the outer diameter surface of each outer annular seal is in contact with the inner radial surface of the outer annular element, and each outer annular seal extends a distance into one of the annular grooves.

6. The fluid damping structure of claim 1, wherein at least some of the plurality of fluid passages are disposed in each first inner ring seal and each second inner ring seal, each of which passages extends between the inner diameter surface and the second lateral surface of the respective inner ring seal.

7. The fluid damping structure of claim 6, wherein the passages are disposed uniformly around a circumference of the respective inner ring seal.

8. A gas turbine engine, comprising:
    at least one rotor shaft extending between a compressor section and a turbine section;
    at least one bearing compartment disposed to support the rotor shaft, the bearing compartment having at least one bearing and at least one fluid damping structure, wherein the fluid damping structure includes:
        an inner annular element having an outer radial surface and a plurality of annular grooves disposed in the outer radial surface;
        an outer annular element having an inner radial surface;
        a first inner ring seal and a second inner ring seal, each inner ring seal having a first lateral surface, a second lateral surface, an inner diameter surface, and an outer diameter surface;
        a first outer annular seal and a second outer annular seal;
        a damping chamber defined by the inner annular element, the outer annular element, the first inner ring seal, and the second inner ring seal;
        a first lateral chamber disposed on a first axial side of the damping chamber, and defined by the inner annular element, the outer annular element, the first inner ring seal, and the first outer annular seal;
        a second lateral chamber disposed on a second axial side of the damping chamber, and defined by the inner annular element, the outer annular element, the second inner ring seal, and the second outer annular seal, wherein the second axial side is opposite the first axial side;
        a plurality of fluid passages disposed in at least one of the inner annular element or the inner ring seals, wherein said fluid passages disposed in the inner annular element are engaged with at least two of the plurality of annular grooves;
        a first annular plenum disposed in the inner radial surface of the outer annular element aligned with the first lateral chamber;
        a first lateral chamber port providing fluid communication into the first annular plenum;
        a second annular plenum disposed in the inner radial surface of the outer annular element aligned with the second lateral chamber; and
        a second lateral chamber port providing fluid communication into the second annular plenum;
        wherein the fluid damping structure is configured such that one or more of the fluid passages is disposed in an open configuration when a local damping fluid pressure within the damping chamber is less than a local damping fluid pressure in an adjacent region of one or both of the lateral chambers, and the one or more of the fluid passages is disposed in a closed configuration when the local damping fluid pressure within the damping chamber is greater than the local damping fluid pressure in the adjacent region of the one or both lateral chambers; and
    a lubrication system configured to provide a fluid flow to the fluid damping structure.

9. The gas turbine engine of claim 8, wherein the plurality of annular grooves include a first inner annular groove and a second inner annular groove, each inner annular groove having an inner side surface and an opposing outer side surface and a width that extends there between; and
wherein the plurality of fluid passages are disposed in the inner annular element, extending between the inner side surface of each inner annular groove and the outer radial surface of the inner annular element.

10. The gas turbine engine of claim 9, wherein the fluid passages are disposed uniformly around a circumference of the inner annular element.

11. The gas turbine engine of claim 8, wherein the first outer annular seal and the second outer annular seal are ring seals, and each outer annular seal has an outer diameter surface, and the outer diameter surface of each outer annular seal is in contact with the inner radial surface of the outer annular element, and each outer annular seal extends a distance into one of the annular grooves.

12. The gas turbine engine of claim 8, wherein at least some of the plurality of fluid passages are disposed in each first inner ring seal and each second inner ring seal, each of which fluid passages extends between the inner diameter surface and the second lateral surface of the respective inner ring seal.

13. The gas turbine engine of claim 12, wherein the fluid passages are disposed uniformly around a circumference of the respective inner ring seal.

14. The gas turbine engine of claim 8, wherein the fluid damping structure further comprises damping chamber port disposed within the inner annular element providing fluid communication into the damping chamber.

15. The gas turbine engine of claim 14, wherein the engine is configured to provide the fluid flow from the lubrication system to the fluid damping structure through the damping chamber port, and is configured to permit fluid flow to exit the fluid damping structure through the first lateral chamber port and the second lateral chamber port.

16. The gas turbine engine of claim 8, wherein the engine is configured to provide the fluid flow from the lubrication system to the fluid damping structure through the first lateral chamber port, and is configured to permit fluid flow to exit the fluid damping structure through the second lateral chamber port.

17. The gas turbine engine of claim 14, wherein the engine is configured to provide the fluid flow from the lubrication system to the fluid damping structure through first lateral chamber port and the second lateral chamber port, and to permit fluid flow to exit the fluid damping structure through the damping chamber port.

18. The gas turbine engine of claim 8, wherein the plurality of fluid passages are disposed in the inner ring seals.

19. The fluid damping structure of claim 1, wherein
the first annular plenum projects radially partially into the outer annular element from the inner radial surface such that the first annular plenum axially interrupts the inner radial surface, and the first annular plenum extends radially between and fluidly couples the first lateral chamber port and the first lateral chamber; and
the second annular plenum projects radially partially into the outer annular element from the inner radial surface such that the second annular plenum axially interrupts the inner radial surface, and the second annular plenum extends radially between and fluidly couples the second lateral chamber port and the second lateral chamber.

20. The fluid damping structure of claim 1, wherein
a first of the fluid passages comprises a first notch in a first corner of the inner annular element;
a second of the fluid passages comprises a second notch in a second corner of the inner annular element; and
the first of the fluid passages and the second of the fluid passages are located axially between the first inner ring seal and the second inner ring seal.

* * * * *